United States Patent
Nolfi, Jr. et al.

(10) Patent No.: US 11,001,914 B2
(45) Date of Patent: May 11, 2021

(54) MACHINABLE METAL MATRIX COMPOSITE AND METHOD FOR MAKING THE SAME

(71) Applicant: DSC MATERIALS LLC, Conroe, TX (US)

(72) Inventors: Frank V Nolfi, Jr., Conroe, TX (US); Simon John Barnes, Congleton (GB); William John Frederick Morgan, Wimborne (GB)

(73) Assignee: DSC MATERIALS LLC, Conroe, TX (US)

(*) Notice: Subject to any disclaimer, the term of this patent is extended or adjusted under 35 U.S.C. 154(b) by 0 days.

(21) Appl. No.: 16/396,204

(22) Filed: Apr. 26, 2019

(65) Prior Publication Data

US 2019/0249279 A1 Aug. 15, 2019

Related U.S. Application Data

(63) Continuation-in-part of application No. 15/877,692, filed on Jan. 23, 2018.

(51) Int. Cl.

| | |
|---|---|
| *C22C 32/00* | (2006.01) |
| *C22C 1/05* | (2006.01) |
| *C04B 35/053* | (2006.01) |
| *C04B 41/45* | (2006.01) |
| *C04B 35/111* | (2006.01) |
| *C04B 41/88* | (2006.01) |
| *C22C 29/00* | (2006.01) |
| *C04B 41/00* | (2006.01) |
| *C22C 1/10* | (2006.01) |

(52) U.S. Cl.
CPC ............ *C22C 32/00* (2013.01); *C04B 35/053* (2013.01); *C04B 35/111* (2013.01); *C04B 41/009* (2013.01); *C04B 41/4523* (2013.01); *C04B 41/88* (2013.01); *C22C 1/05* (2013.01); *C22C 29/00* (2013.01); *C22C 32/0036* (2013.01); *C04B 2235/5445* (2013.01); *C04B 2235/6562* (2013.01); *C04B 2235/661* (2013.01); *C04B 2235/77* (2013.01); *C22C 1/1036* (2013.01)

(58) Field of Classification Search
None
See application file for complete search history.

(56) References Cited

U.S. PATENT DOCUMENTS

| | | | |
|---|---|---|---|
| 5,702,542 | A | 12/1997 | Brown et al. |
| 6,517,953 | B1 | 2/2003 | Schultz et al. |
| 6,723,279 | B1 | 4/2004 | Withers et al. |
| 6,884,522 | B2 | 4/2005 | Adams et al. |

(Continued)

FOREIGN PATENT DOCUMENTS

WO  2009/080560 A2  7/2009

*Primary Examiner* — Adam Krupicka
(74) *Attorney, Agent, or Firm* — Hauptman Ham, LLP

(57) ABSTRACT

A metal matrix composite comprises and/or consists of a uniform distribution of calcined ceramic particles having an average particle size of between 0.30 and 0.99 microns and a metal or alloy uniformly distributed with the ceramic particles and wherein the ceramic particles include oxides of two separate metals selected from the group consisting of Al, Li, Be, Pb, Fe, Ag, Au, Sn, Mg, Ti, Cu, and Zn, and in which said ceramic particles comprise at least 15 volume percent of the metal matrix sintered together and wherein said metal-matrix being machinable with a high speed steel (HSS) bit for greater than about one minute without excessive wear to the bit.

17 Claims, 1 Drawing Sheet

(56) References Cited

U.S. PATENT DOCUMENTS

| | | |
|---|---|---|
| 6,927,421 B2 | 8/2005 | Ishikawa et al. |
| 7,141,310 B2 | 11/2006 | Adams et al. |
| 7,216,746 B2 | 5/2007 | Yamamoto et al. |
| 7,267,882 B2 | 9/2007 | Breslin et al. |
| 7,357,976 B2 | 4/2008 | Yamamura et al. |
| 8,201,648 B2 | 6/2012 | Choe et al. |
| 8,322,398 B2 | 12/2012 | Hirotsuru et al. |
| 8,336,425 B2 | 12/2012 | Mandel et al. |
| 8,535,604 B1 | 9/2013 | Baker et al. |
| 8,550,145 B2 | 10/2013 | Wood et al. |
| 8,651,407 B2 | 2/2014 | Berton |
| 9,238,390 B2 | 1/2016 | Loukus et al. |
| 9,429,202 B2 | 8/2016 | Moore et al. |
| 9,550,341 B2 | 1/2017 | Loukus et al. |
| 9,714,686 B2 | 7/2017 | Moore et al. |
| 2001/0033038 A1 | 10/2001 | Sakaguchi et al. |
| 2002/0011320 A1 | 1/2002 | Ruhland |
| 2002/0195223 A1 | 12/2002 | Herbst |
| 2003/0217828 A1 | 11/2003 | Opoku-Adusei et al. |
| 2004/0173291 A1 | 9/2004 | Rozenoyer et al. |
| 2006/0169434 A1 | 8/2006 | Fujita |
| 2006/0249500 A1 | 11/2006 | Kudo et al. |
| 2009/0011211 A1 | 1/2009 | Weinstein et al. |
| 2009/0035554 A1 | 2/2009 | Fujita et al. |
| 2009/0136377 A1 | 5/2009 | Yamana et al. |
| 2009/0197074 A1 | 8/2009 | Fujita et al. |
| 2010/0009163 A1 | 1/2010 | Lindemann et al. |
| 2010/0152015 A1 | 6/2010 | Staudenecket et al. |
| 2011/0003680 A1 | 1/2011 | Lindemann et al. |
| 2011/0101575 A1 | 5/2011 | Fujita et al. |
| 2013/0087420 A1 | 4/2013 | Fraley et al. |
| 2014/0283741 A1 | 9/2014 | Zhang et al. |
| 2016/0101468 A1 | 4/2016 | An et al. |
| 2017/0028464 A1 | 2/2017 | Ruehle et al. |
| 2017/0074046 A1 | 3/2017 | Izbinski et al. |
| 2017/0100771 A1 | 4/2017 | Voglewede et al. |

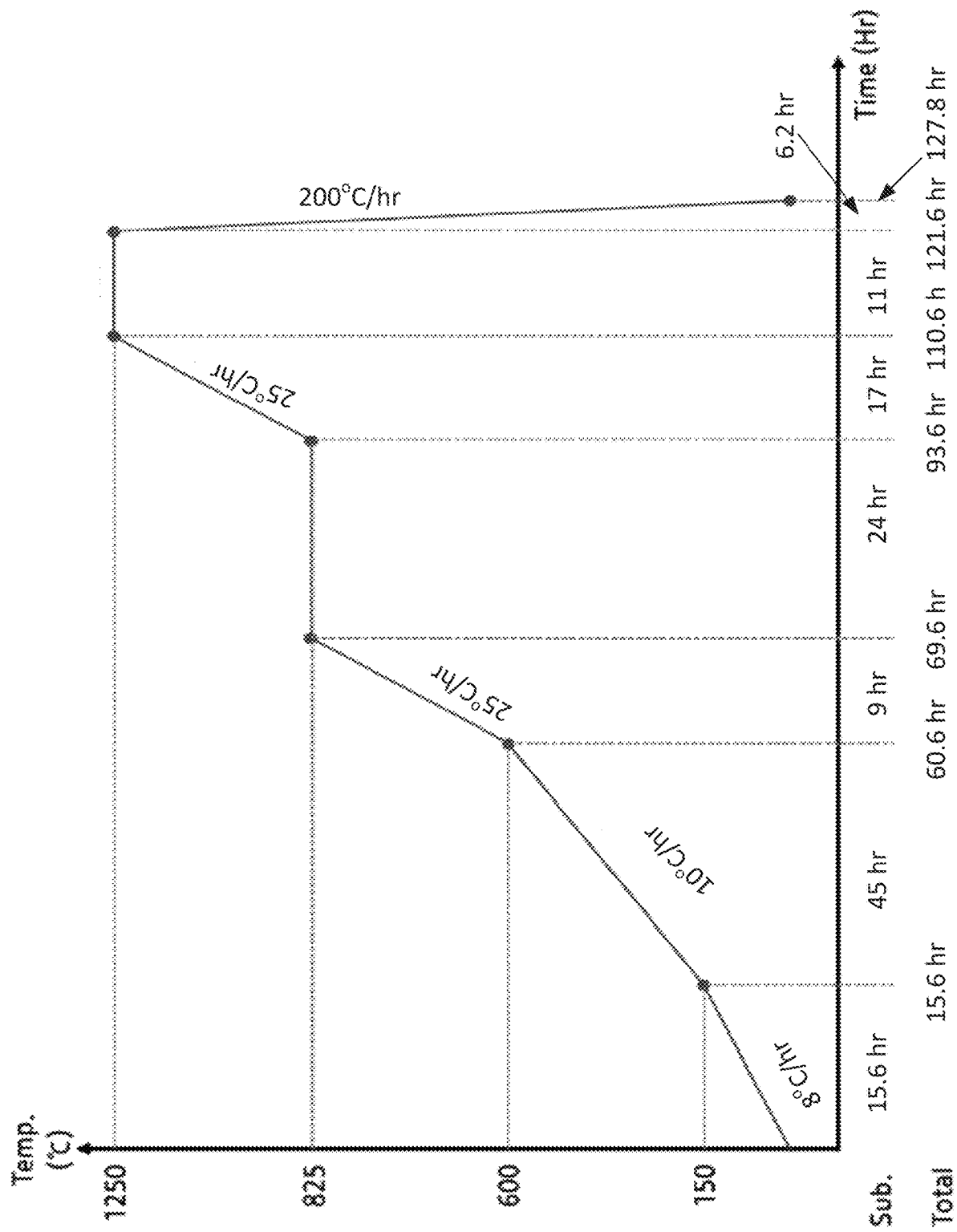

MACHINABLE METAL MATRIX COMPOSITE AND METHOD FOR MAKING THE SAME

FIELD

One or more embodiments of the present invention relate to a relatively lightweight metal ceramic composite and to an improved composite with machinability. The composite includes uniformly distributed ceramic particles which increase the mechanical and physical properties of the composite without adversely reducing its ductility and machinability.

BACKGROUND

Metal-matrix composites are metals or alloys strengthened with tiny inclusions of a ceramic material which inhibits crack growth and increases performance. Such materials which inhibit crack growth and increase performance have mechanical and physical properties that are superior to those of most pure metals and some alloys and most polymer-matrix composites, especially at high temperatures. These advantages to tailor both mechanical and physical characteristics of metal-matrix composites are important features of such materials.

An early patent, U.S. Pat. No. 5,702,542 of Brown et al. that issued on Dec. 30, 1997, discloses metal-matrix composites and methods for producing such composites. The manufacturing methods including providing a ceramic preform having a uniform distribution of ceramic particles sintered to one another. The particles include an average particle size of no greater than about 3 microns, and at least one half of the volume of the preform is occupied by porosity. The preform is then disposed into a mold and contacted by molten metal. The molten metal is then forced into the pores of the preform and permitted to solidify to form a solid metal-matrix composite. This composite is machinable with a high-speed steel (HSS) bit for greater than about 1 minute without excessive wear occurring to the bit. This invention preferably employs metal-matrixes including Al, Li, Be, Pb, Fe, Au, Ag, Sn, Mg, Ti, Cu, and Zn. Preferred ceramics include oxides, borides, nitrides, carbides, carbon, or mixtures thereof. Inert gas pressures of less than about 3,000 psi can be used to easily infiltrate the preforms.

A more recent U.S. patent of Wood et al., U.S. Pat. No. 8,550,145 entitled "Method of Manufacturing A Metal Matrix Composite," relates to a method of forming a metal matrix composite (MMC), such as a brake drum, by impregnating a preform, which is formed of ceramic particles and ceramic fibers, with a support element, such as a metal. The MMC has a wear surface defined by both the preform and the support element.

A recent U.S. Pat. No. 9,714,686 of Moore et al. issued on Jul. 25, 2017. That application discloses a ceramic preform, a method of making a ceramic preform, a metal-matrix composite comprising a ceramic preform, and a method of making a metal-matrix composite. The method of making a ceramic preform generally comprises preparing reinforcing fibers, preparing a ceramic compound, and forming the compound into a desired shape to create the ceramic preform. In certain embodiments, the ceramic compound is formed as either a disc or a ring for use in a brake disc metal matrix composite. The metal matrix composite generally comprises the ceramic preform infiltrated with a molten metal to form the brake disc metal matrix composite. The method of making the metal-matrix composite generally comprises heating the ceramic preform, placing the ceramic preform in a mold cavity of a die cast mold, and introducing molten metal into the mold cavity to infiltrate the ceramic preform to form the brake disc metal-matrix composite.

SUMMARY

An embodiment of the invention is a metal-matrix composite comprising a uniform distribution of calcined ceramic particles having an average particle size of between 0.35 and 0.99 microns and a metal or alloy uniformly distributed with said ceramic particles and in which said ceramic particles include oxides of two (2) separate metals selected from the group consisting of Al, Li, Be, Pb, Fe, Ag, Au, Sn, Mg, Ti, Cu, and Zn, and in which said ceramic particles comprise at least 15 volume percent of the metal matrix and wherein said metal-matrix composite being machinable with a high speed steel (HSS) bit for greater than about one (1) minute without excessive wear to the bit.

One or more embodiments of the present invention will now be described in connection with the accompanying drawing wherein like reference numbers are used to identify like parts.

BRIEF DESCRIPTION OF THE DRAWINGS

Aspects of the present disclosure are best understood from the following detailed description when read with the accompanying FIGURES. It is noted that, in accordance with the standard practice in the industry, various features are not drawn to scale. In fact, the dimensions of the various features may be arbitrarily increased or reduced for clarity of discussion.

FIG. 1 is a graphical illustration of the heating steps for forming a metal matrix composition in accordance with an embodiment of the present invention.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In the following embodiments of the invention, at least one embodiment is illustrated by the second embodiment. Other embodiments are shown by Examples 1, 3 and 4. To be more specific, Example 1 is an embodiment of the present invention which comprises a 65% by volume 6061 aluminum with a reinforcement of 35% by volume of alumina (Al2O3). The ceramic precursor material is typically batched according to the following recipe:

Example 1

| Material | Per Batch (lbs.) |
|---|---|
| Almatis Calcined Alumina A-1000 SG | 100.0 |
| Magchem 10 MgO 325 | 0.05 |
| Carbon Black N990 | 22.9 |
| Graphite M-450 | 31.5 |
| Organic Binders | 5.2 |
| Water | 82.1 |

Alumina (Al2O3) and/or magnesium oxide (MgO) are dispersed in de-ionized water in a mixing tank while constantly mixing, the primary slurry is then milled until an alumina (Al2O3) particle size of about 0.5 micron is obtained, and then the carbon black is added followed by the graphite into the primary slurry and the entire mixture milled for about another 8 hours, additional binders are added to the secondary slurry which is milled for an additional 4 hours, and then dried. The dried powder is pressed into a desired shape (preform) then fired in a kiln according to the steps in FIG. 1.

The fired alumina preform, which is about 65% by volume inter-connected porosity and placed into a crucible along with 6061 aluminum, all of which is heated under vacuum to a temperature of about 750° C. in a pressure infiltration vessel and the resulting liquid aluminum is then squeezed into the preform by gradually applying inert gas pressure to about 2000 psi and subsequently cooled to room temperature.

Example 2 comprises a composite matrix of 65% by volume aluminum 6061 and a reinforcement of 30% by volume alumina (Al2O3) and about 5% by volume magnesium oxide (MgO). The batching recipe, is the same as in Example 1 except in Example 2 (preferred embodiment) there is 86 pounds of alumina and 13 pounds of magnesium oxide and the firing and infiltration processes are the same as in Example 1.

In Example 3, the composite matrix contains 65% by volume AZ31B magnesium and the reinforcement is 30% by volume magnesium oxide (MgO), 5% by volume alumina (Al2O3) reinforcement and the batching recipe and the firing and infiltration processes are the same as in Example 2 except in Example 3 there is 14 pounds of alumina (Al2O3) and 79 pounds of magnesium oxide (MgO).

Example 4 has a composite matrix of 65% by volume AZ31B magnesium and the reinforcement is 35% by volume magnesium oxide (MgO) and the batching recipe and the firing and infiltration processes are the same as in Example 1 except alumina is 0 pounds and magnesium oxide is 92 pounds.

Particularly attractive finished products are light weight, strong and stiff such as pistons, connecting rods and rocker arms for internal combustion engines and brake components made from the composite, for Example 1. Pistons and brake components made from composite, Example 3, additionally offer exceptionally low weight.

It should also be recognized that the composites of the Examples have a tensile modulus which is at least 30 to 200% greater than the tensile modulus of the metal and wherein the metal ceramic composite has a ductility of at least about 30% of the ductility of the metal and wherein the composite has a tensile strength of at least twice that of the metal and retains the tensile strength ratio at temperatures up to about one-half the melting point of the metal and in which the metal matrix composite is machinable with a high-strength steel bit for greater than about one minute without serious damage to the bit.

A metal-matrix composite comprising a uniform or substantially uniform distribution of calcined ceramic particles having an average particle size of less than about one micron and a metal or alloy substantially uniformly distributed with the ceramic particles and a meso-structure of less than 200 microns.

In a fifth embodiment of the invention at least about 80 percent of the ceramic particles are uniformly distributed on a scale of three (3) times the particle size.

In a sixth embodiment of the invention at least 90 percent of the ceramic particles are uniformly distributed on a scale of two (2) times the particle size.

In a seventh embodiment of the invention the ceramic particles have an aspect ratio of no greater than about three to one (3:1).

Further, in an eighth embodiment of the invention the ceramic particles have an aspect ratio of no greater than about two to one (2:1).

In a ninth embodiment of the invention the composite has a tensile modulus which is at least thirty (30) to two hundred (200) percent greater than the tensile modulus of said metal.

In a tenth example of the invention the metal-matrix composite has a tensile strength of at least twice of said metal and retains said tensile strength ratio at temperatures up to about one-half the melting point of said metal.

According to an eleventh embodiment and/or example of the metal-matrix composite, the metal-ceramic composite has a ductility of at least about 30 percent of the ductility of said metal and in which said metal-matrix composite comprises a uniform distribution of calcined ceramic particles having an average particle size of between 0.35 and 0.99 microns and a metal or alloy substantially uniformly distributed with said ceramic particles and in which said ceramic particles include oxides of two (2) separate metals selected from the group consisting of Al, Li, Be, Pb, Fe, Ag, Au, Sn, Mg, Ti, Cu, and Zn, and in which said ceramic particles comprise at least 15 volume percent of the metal matrix and wherein the metal-matrix composite being machinable with a high speed steel (HSS) bit for greater than about one (1) minute without excessive wear to said bit.

In Example 12, the metal-matrix composite has a tensile strength of at least twice that of the metal and retains said tensile strength ratio at temperatures up to about one-half the melting point of said metal.

In Example 13, the metal-matrix composite in which the metal matrix composite is machinable with a high-speed steel bit for greater than about one (1) minute without excessive wear to the bit.

In Example 14, the metal-matrix composite wherein the composite has a tensile modulus which is at least about thirty (30) to two hundred (200) percent greater than the tensile modulus of the metal.

Example 15 is a metal-matrix composite wherein a uniform or substantially uniform distribution of calcined ceramic particles have an average particle size of no greater than about one (1) micron and a metal or alloy substantially uniform and distributed with the ceramic particles and a meso-structure of less than 200 microns in which ceramic particles comprise at least about 15 volume percent of the metal-matrix and in which the ceramic particles are thermally stable in the metal-matrix.

In embodiment 16, the metal-matrix composite wherein the ceramic particles are chemically stable in the molten metal or alloy.

In Example 17, the metal-matrix composite in which the ceramic particles comprise an oxide, boride, nitride, carbide, carbon or a combination thereof and a metal or alloy substantially uniformly distributed with the ceramic particles, the metal or alloy comprising Al, Li, Be, Pb, Fe, Ag, Au, Sn, Mg, Ti, Cu, Zn, or a mixture thereof.

In Example 18, the metal-matrix composite in which the metal is selected from the group consisting of aluminum, magnesium and mixtures thereof and the reinforcement is selected from the group consisting of alumina (Al2O3), magnesium oxide (MgO) and mixtures thereof and wherein the composite is 65% by volume 6061 aluminum and 35% by volume a mixture of alumina and magnesia (MgO), and wherein the ceramic precursor material is batched according to the following recipe:

| Material | Per Batch (lbs.) |
|---|---|
| Almatis Calcined Alumina A-1000 SG | 100.0 |
| Magchem 10 MgO 325 | 0.05 |
| Carbon Black N990 | 22.9 |
| Graphite M-450 | 31.5 |
| Organic Binders | 5.2 |
| Water | 82.1 |

Alumina (Al2O3) and/or magnesium oxide (MgO) is dispersed in de-ionized water in a mixing tank while constantly mixing and the primary slurry is then milled until an alumina (Al2O3) particle size of about 0.5 micron is obtained, and the carbon black, followed by the graphite, is dispersed in a primary slurry and a resulting mixture milled for about 8 hours, additional binders are added to the secondary slurry which are milled for an additional 8 hours plus 4 hours, dried and pressed into a desired shape and then fired in a kiln according to the steps in FIG. 1.

The fired alumina preform, which is ~65% by volume inter-connected porosity, is then placed into a crucible, along with the 6061 aluminum, all of which is heated under vacuum to a temperature of ~750 degrees C. in a pressure infiltration vessel. The resulting liquid aluminum is then squeezed into the preform by gradually applying inert gas pressure to ~2000 psi. The resulting billet is then cooled to room temperature.

In Example 19, a metal-matrix composite comprising a uniform or substantially uniform distribution of calcined ceramic particles having an average particle size of between 0.35 and 0.99 microns and a metal or alloy substantially uniformly distributed with the ceramic particles and a meso-structure of less than 200 microns in which the ceramic particles comprise at least 15 volume percent of the metal-matrix and the metal-matrix composites being machinable with a high-speed steel (HSS) for greater than about one (1) minute without excessive wear to the bit and in which the metal is selected from the group consisting of aluminum and magnesium and mixtures thereof; and wherein at least 80% of the ceramic particles are uniformly distributed on a scale of three times the particle size; and in which the ceramic particle have an aspect ratio of no greater than about three to one (3:1).

While one or more embodiments of the present invention have been described in connection with its preferred embodiments it should be recognized that changes and modifications may be made therein without departing from the scope of the appended claims.

In Example 20, the magnesium oxide (MgO) in Examples 1 through 19 is obtained by first batching the mixes with magnesium hydroxide (Mg(OH)2) rather than magnesium oxide (MgO) which is then converted to magnesium oxide (MgO), after pressing into a preform, by dehydration of the magnesium hydroxide (Mg(OH)2).

In Example 20, batching with magnesium hydroxide (Mg(OH)2) is substituted in place of batching with magnesium oxide (MgO) in all embodiments of the invention.

What is claimed is:

1. A metal-matrix composite comprising:
   a substantially uniform distribution of ceramic particles having an average particle size of between 0.35 and 0.99 microns and a meso-structure of less than 200 microns; and
   a metal substantially uniformly distributed between the ceramic particles, wherein the metal comprises aluminum, magnesium, or a mixture or alloy thereof;
   wherein the ceramic particles comprise a mixture of at least aluminum oxide ($Al_2O_3$) and magnesium oxide (MgO), and wherein the ceramic particles are chemically stable in the metal at a temperature above a melting point of the metal;
   wherein the metal-matrix composite is no greater than 85% by volume the metal and no less than 15% by volume the ceramic particles, and
   wherein the ceramic particles are prepared from a ceramic precursor material that is batched according to the following recipe:

| Material | Per Batch (lbs.) |
|---|---|
| Almatis Calcined Alumina A-1000 SG | 100.0 |
| Magchem 10 MgO 325 | 0.05 |
| Carbon Black N990 | 22.9 |
| Graphite M-450 | 31.5 |
| Organic Binders | 5.2 |
| Water | 82.1 | wherein the ($Al_2O_3$) and MgO are dispersed in de-ionized water to form a first slurry,
   the first slurry is then milled until an ($Al_2O_3$) particle size of about 0.5 micron is obtained in a second slurry,
   the carbon black and the graphite, are then dispersed in the second slurry and milled to obtain a third slurry,
   after which the organic binders are added to the third slurry to obtain a fourth slurry which is then milled to obtain a final slurry,
   the final slurry is then dried and pressed into a preform shape and subjected to a thermal treatment process to obtain a ceramic preform having about 65% by volume open cell porosity,
   the ceramic preform is then placed into an infiltration vessel, along with a volume of the metal, and heated, in a non-oxidizing atmosphere, to a temperature above a melting point of the metal to obtain a molten metal; and
   a gas pressure is then increased in the infiltration vessel to reach an infiltration pressure sufficient to force the molten metal into the ceramic preform and obtain the metal-matrix composite.

2. The metal-matrix composite according to claim 1, wherein:

at least 90 percent of the ceramic particles are uniformly distributed on a scale of two (2) times the average ceramic particle size.

3. The metal-matrix composite according to claim 1, wherein the ceramic particles have an aspect ratio of no greater than about 2:1.

4. The metal-matrix composite according to claim 1, wherein the metal-matrix composite has a tensile modulus which is at least 30 percent greater than the tensile modulus of the metal.

5. The metal-matrix composite according to claim 1, wherein the metal-matrix composite has a tensile strength of at least twice that of the metal and retains a 2:1 tensile strength ratio up to a temperature of about one-half of a melting point of the metal.

6. The metal-matrix composite according to claim 1, wherein the thermal treatment process comprises maintaining the preform shape at a treatment temperature above 750 degrees C. for a treatment period of at least 24 hours.

7. The metal-matrix composite according to claim 1, wherein
   at least 80% of the ceramic particles are substantially uniformly distributed on a scale of three times the particle size; and
   wherein the ceramic particles have an aspect ratio no greater than about 3:1.

8. The metal-matrix composite according to claim 7, wherein the ceramic particles comprise magnesium oxide (MgO) particles that where produced by dehydrating magnesium hydroxide ($Mg(OH)_2$).

9. The metal-matrix composite according to claim 7, wherein the final slurry is spray dried under conditions to form spray dried particles having a median particle size of less than 200 microns.

10. The metal-matrix composite according to claim 7, wherein the ceramic particles include magnesium oxide particles that were produced by dehydrating magnesium hydroxide ($Mg(OH)_2$) particles.

11. A metal-matrix composite comprising:
   a substantially uniform distribution of ceramic particles having an average particle size of between 0.35 and 0.99 microns; and
   a metal substantially uniformly distributed between the ceramic particles, wherein the metal comprises aluminum, magnesium, or a mixture or alloy thereof;
   wherein the ceramic particles comprise a mixture of at least aluminum oxide ($Al_2O_3$) and magnesium oxide (MgO) and wherein the ceramic particles are chemically stable in the metal at a temperature above a melting point of the metal;
   wherein the metal-matrix composite is no greater than 85% by volume the metal and no less than 15% by volume the ceramic particles, and
   wherein the ceramic particles are prepared from a ceramic precursor material that is batched according to the following recipe:

| Material | Per Batch (lbs.) |
|---|---|
| Particulate Oxides | 100.0 |
| Carbon Black N990 | 22.9 |
| Graphite | 31.5 |
| Organic Binders | 5.2 |
| Water | 82.1 | wherein the particulate oxides, the carbon black, the graphite, and the organic binders are dispersed in water and milled to form a slurry having an $Al_2O_3$ particle size of about 0.5 micron,
   the slurry is then dried and pressed into a preform shape;
   the preform shape is then subjected to a thermal treatment process to produce a ceramic preform having about 65% by volume open cell porosity,
   the ceramic preform is then placed into an infiltration vessel, along with a volume of the metal and heated to an infiltration temperature above a melting point of the metal to obtain a molten metal; and
   the molten metal is then forced into the open cell porosity of the ceramic preform under an infiltration pressure and then cooled to obtain the metal-matrix composite.

12. The metal-matrix composite according to claim 11, wherein:
   the ceramic particles comprise no more than about 35 vol % of the metal-matrix composite and wherein at least 80 percent of the ceramic particles are uniformly distributed on a scale of three times the average ceramic particle size.

13. The metal-matrix composite according to claim 11, wherein
   the ceramic particles have an aspect ratio of no greater than about 3:1.

14. The metal-matrix composite according to claim 11, wherein the metal-matrix composite has a ductility of at least about 30 percent of the ductility for the metal and wherein the ceramic particles further comprise an oxide of an additional metal selected from the group consisting of Li, Be, Pb, Fe, Ag, Au, Sn, Ti, Cu, and Zn, and in which the ceramic particles comprise at least 15 volume percent of the metal matrix composite.

15. The metal-matrix composite according to claim 11, wherein the metal-matrix composite has a tensile strength of at least twice that of the metal at temperatures up to about one-half the melting point of the metal.

16. The metal-matrix composite according to claim 11, wherein the metal-matrix composite has a tensile modulus which is at least about 30 percent greater than the tensile modulus of the metal.

17. The metal-matrix composite according to claim 11, wherein:
   the ceramic particles further comprise an additional oxide, boride, nitride, carbide, carbonate, or a combination thereof; and
   the metal further comprises a minor portion of an additional metal selected from the group consisting of Li, Be, Pb, Fe, Ag, Au, Sn, Ti, Cu, Zn, or a mixture or alloy thereof.

* * * * *